United States Patent [19]
Palmer

[11] 3,748,387

[45] July 24, 1973

[54] METHOD AND APPARATUS FOR EDIT MARKING TELEPRINTER TAPE AND MAKING FINAL PRINT THEREFROM

[76] Inventor: Donald R. Palmer, 5629 61st Dr. N.E., Marysville, Wash.

[22] Filed: Mar. 8, 1971

[21] Appl. No.: 121,688

[52] U.S. Cl.................. 178/112, 178/17 B, 178/92, 197/20
[51] Int. Cl.............................................. B41j 5/38
[58] Field of Search...................... 178/92, 112, 111, 178/17 B, 17 A; 197/19, 20; 235/61.9 R

[56] References Cited
UNITED STATES PATENTS

| | | | |
|---|---|---|---|
| 2,807,664 | 9/1957 | Kleinberg et al.............. | 178/23 R X |
| 2,902,215 | 9/1959 | Lauschke...................... | 235/61.9 R |
| 3,260,340 | 7/1966 | Locklar................................. | 197/19 |
| 3,255,314 | 6/1966 | Howard ............................... | 178/92 |
| 3,465,866 | 9/1969 | Gehring ............................... | 197/20 |
| 2,667,535 | 1/1954 | Slayton.............................. | 178/112 |

Primary Examiner—Thomas W. Brown
Attorney—John O. Graybeal, Delbert J. Barnard, James R. Uhlir and Robert B. Hughes

[57] ABSTRACT

A teletype tape edit marking apparatus which marks on a teletype tape the location of each punctuating period and each paragraph separation. This apparatus has a tape reader connected to a logic circuit which ascertains (a) a bite pattern corresponding to periods and (b) a sequence of three bite patterns corresponding to a paragraph separation. The logic circuit in turn activates either a period marker or a paragraph marker for the tape.

In the method of the present invention, the teletype machine produces a teletype tape and a separate news printout. The news printout is edited (e.g., by deleting certain paragraphs or sentences) in a conventional manner. The selected matter from the news printout is compared to the edit marked tape, and corresponding paragraphs and sentences are selected from the tape, with the deleted matter simply being physically removed (e.g. by cutting) from the tape. Then the tape is fed into a type setting machine which produces type suitable for final printing.

52 Claims, 11 Drawing Figures

INVENTOR.
DONALD R. PALMER

BY
ATTORNEYS

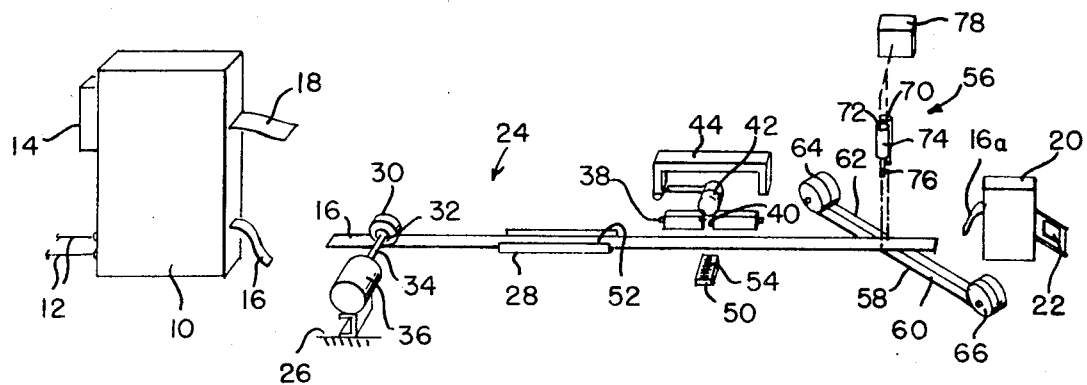
FIG. 3
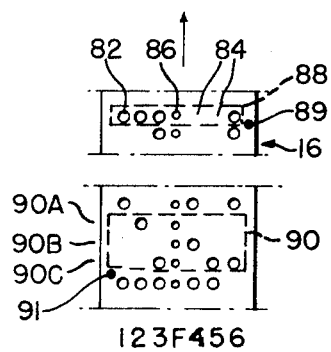
FIG. 4
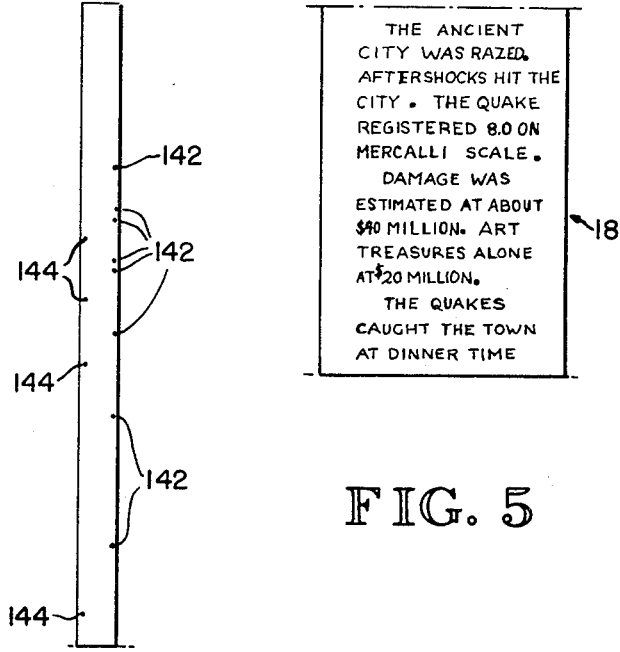
FIG. 4A
FIG. 5

INVENTOR.
DONALD R. PALMER

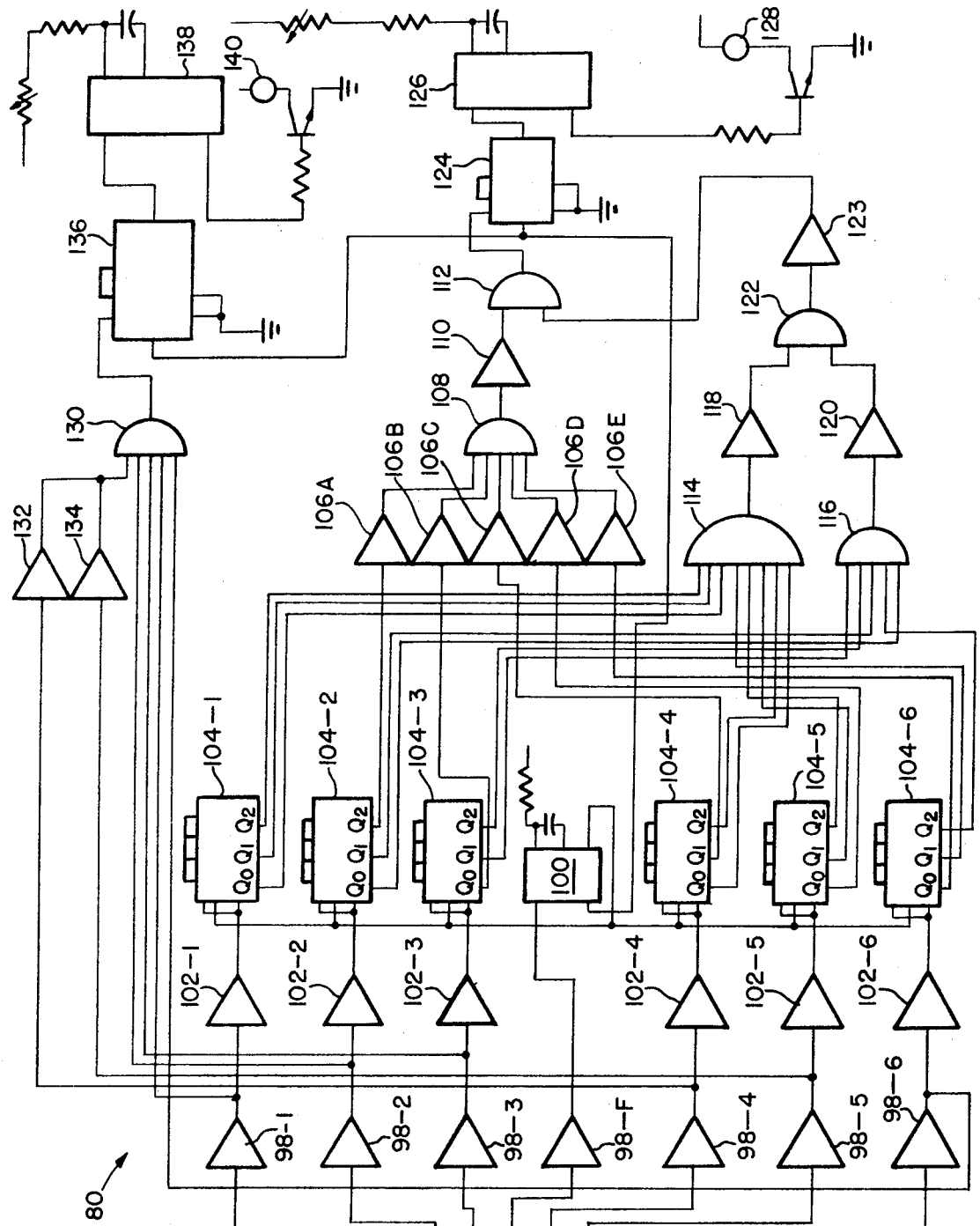

METHOD AND APPARATUS FOR EDIT MARKING TELEPRINTER TAPE AND MAKING FINAL PRINT THEREFROM

BACKGROUND OF THE INVENTION

1. Field of the Invention

The present invention relates generally to the field of handling information, such as news information, in printed and coded form, and more particularly to receiving such information (e.g. news service information) in the form of Teletype tape and printed readouts, selecting the desired news items and reproducing this in type for final printing.

2. Description of the Prior Art

The most relevant prior art known to the applicant is the present method and apparatus used in many present-day newspaper operations in receiving news from a wire service or other source, and by use of Teletype machines and type setting machines preparing this news for final print. This can best be described with reference to FIG. 1 in the accompanying drawings, labeled as "Prior Art".

A major source of news for a newspaper is the many news items which come to the newspaper over one or more of the various news wire services. In a typical newspaper operation many of these news stories are not used at all, and often for space limitations and other reasons those news stories which are used are edited so that some paragraphs or sentences (usually near or at the end portion of the news story) are deleted from the news story. This is also true sometimes of stories written in the newspaper office, in that when the various news items are being organized for printing, portions of these news stories must be deleted.

With reference to FIG. 1, which shows a common prior art sequence of operation, wire service news comes directly over transmission lines into an automatically operated Teletype machine. There are two outputs from this machine: (a) a Teletype tape in which the news story is presented in a commonly accepted coded form, as shown in FIGS. 4 and 4A, and (b) a printed news readout in readable form. A news editor reads the printed news and in some instances totally rejects a news story. In this instance the typed news readout and its associated Teletype tape containing this same story are both discarded.

For those news stories which are selected for printing, the tape for this story is fed into a type setting machine which functions automatically to reproduce the entire story from the Teletype tape into set type. For example, in a linotype machine, which is one kind of type setting machine, the type is reproduced in blocks of letters made from lead. In a photocomp machine, another kind of type setting machine, the set type is produced photographically.

At approximately the same time when the type setting machine is reproducing the entire story, a news editor is examining the typed news readout of that same story and is selecting certain paragraphs and/or sentences for final printing and deleting others. Most often he will simply mark a cutoff point after which all of the remaining news material of that story is deleted. The news editor then marks his selections on the typed news readout and this is compared with the same story which is now in set type. The portion of the story to be deleted is then physically removed from the set type. In the case of linotype, the rows of lead blocks to be deleted from the news story are simply lifted from the total assembly of blocks and dumped back into a lead melting pot for reuse. Then the edited set type, now in final form for printing, is then utilized in a conventional manner to accomplish final printing of the story in a newspaper page. News written in the newspaper office itself is handled in somewhat the same manner. The written news story is manually typed into a Teletype machine to produce a coded tape which in turn functions to operate a type setting machine. If this story is to be edited (have portions thereof deleted), this is quite often done as described above, by deleting portions of the set type.

The main problem with this prior art mode of operation is the added time in getting news stories into final print, since the type setting machine must print entire stories, portions of which are to be deleted. This also causes increased expense of operation of type setting machines.

One prior art patent, U.S. Pat. No. 2,279,161, issued to D'Humy, illustrates a Teletype tape where the printed readout is printed directly onto the Teletype tape itself, and of course with this arrangement the tape can be edited simply by examining the printed matter on the tape. The present invention, however, relates to the problem of editing where the parts of the printed readout are physically uncorrelated or unmatched to the Teletype tape. That is to say, the particular informational units or groups on the readout are not correlated or identified with corresponding informational units or groups on the Teletype tape. This is the case with conventional Teletype machines where the readout and tape are physically separate.

Also, a method of marking a magnetic tape is noted on pages 576 and 577 of "The Audio Cyclopedia," by Howard M. Tremain, which is available in the Scientific Library of the U.S. Patent Office.

SUMMARY OF THE INVENTION

The present invention resides both in a method of reproducing selected information, such as selections from news stories, and apparatus which marks locations of coded information, such as punctuating periods and paragraph separations on Teletype tape, and which apparatus, in combination with a conventional Teletype machine and type setting machine, operates to reproduce such selected information.

The novel apparatus of the present invention comprises a tape feed mechanism which receives Teletype tape and feeds it through a tape reader. A logic circuit receives inputs from the reader and responds to (a) coding on the tape which represents a punctuating period (this being contained in a single unit or "bite" of tape information), and (b) to coding on the tape that represents a paragraph separation (which on conventional Teletype tape is three particular bite patterns arranged in proper sequence). The logic circuit activates a period marker to mark tape locations where there is a period and also activates a paragraph marker to indicate on the tape locations of paragraph separations.

The logic circuit has two sections. In the first section which produces a "period" mark, there is a period pass gate which when activated by a period signal from a reader head, transmits a signal through a counter to a period output relay. The other section of the logic circuit comprises a memory, in the form of shift registers, that holds three bite patterns simultaneously which pass sequentially through the memory as the reader transmits these bite patterns to the memory. In response to a predetermined sequence of the three bite patterns that correspond to a paragraph separation, a signal from a pass gate activates a counter which in turn activates a paragraph output relay which marks on the Teletype tape the location of a paragraph separation.

Thus, it can be seen that the edit marking apparatus indicates on the Teletype tape the location of each punctuating period and the separation of each paragraph of the news story. Thus, it is possible for a person to quickly scan through the tape and ascertain, for example, the location of the first three paragraphs, the first five paragraphs, etc., and the location of particular punctuating periods within any of these paragraphs.

To describe the method of the present invention, reference is made to FIG. 2 of the accompanying drawings. As in the prior art, news stories are transmitted into the Teletype machine, either from a wire service or typed in at the newspaper office, and the output from the Teletype machine is a Teletype tape and a typed news readout. The Teletype tape is fed into the Teletype tape edit marker of the present invention, which functions to mark on the coded tape the locations of punctuating periods and paragraph divisions. The typed news readout is reviewed by a news editor who makes news selections and indicates these on the typed news readout. Next, the selected news items are compared with the corresponding Teletype tape, and the tape sections corresponding to the selected portions of the typed news readout are separated from the deleted sections (simply by snipping away the undesired tape portions with a scissors and splicing the tape where deletions are made in the mid-portion of the type). The tape selection can be made very simply by counting paragraphs on the typed news readout and counting corresponding paragraphs on the marked tape.

The selected tape is then fed into a type setting machine which produces set type corresponding to the finally edited story. This set type can then be put into the final printing process to make final newspaper copy.

DESCRIPTION OF THE DRAWINGS

FIG. 3 is a semi-schematic drawing of the apparatus of the present invention;

FIG. 4 shows a conventional Teletype tape as used in the present invention;

FIG. 4A shows a length of Teletype tape with typical markings made according to the present invention;

FIG. 5 illustrates a typical typed news readout from a conventional Teletype machine;

FIG. 10 illustrates the logic circuit of the present invention.

Figure 1:
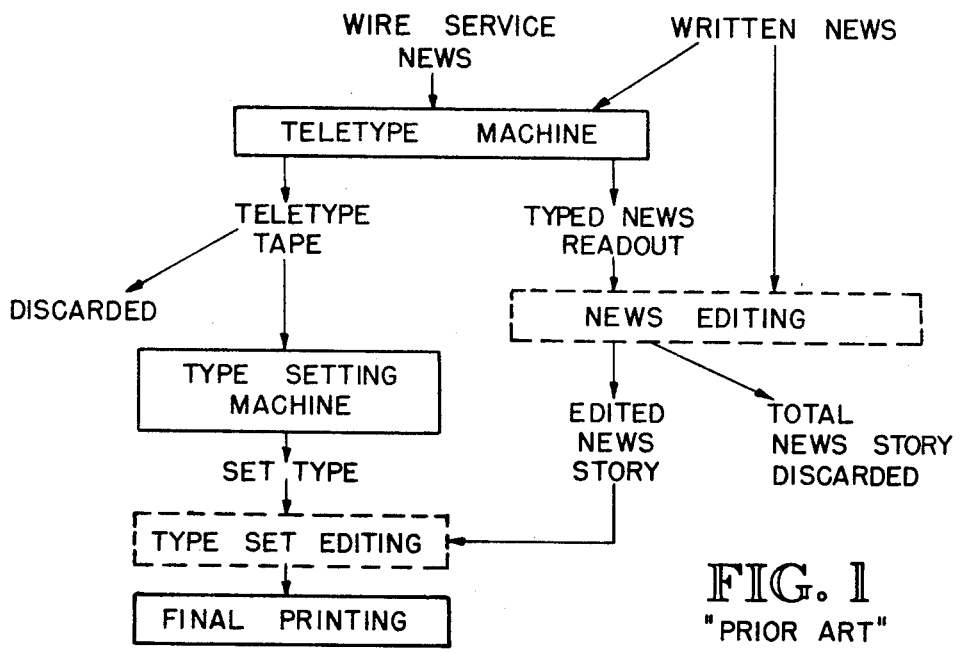
FIG. 1 is a schematic presentation of the prior art method of processing news items through a Teletype machine and typesetting machine into final print.

DESCRIPTION OF THE PREFERRED EMBODIMENT a. The Tape Edit Marker

It is believed that a clearer understanding of the present invention will be attained by first describing the specific apparatus of the Teletype tape edit marker of the present invention, and then describing how this apparatus is used in receiving, selecting and reproducing news information into final form according to the present invention.

With reference to FIG. 3, numeral 10 designates a conventional Teletype machine, which functions to receive an input from either electrical transmission lines 12 or a keyboard, indicated schematically at 14, and whose output comprises a coded Teletype tape 16 and a printed readout 18 which in the present invention is assumed to be a news story readout. As will be described hereinafter, the printed readout 18 goes to a news editor who selects certain news stories and then edits these selected stories, usually by deleting terminal portions of the story. FIGS. 4 and 4A illustrate a typical coded Teletype tape 16 while FIG. 5 illustrates a typical news readout 18.

A type setting machine is indicated schematically at 20. This can be a linotype machine, a photocomp machine, or other device which functions to receive coded Teletype tape and translate this into set type. The Teletype tape entering the machine is designated 16a, while the set type, which is output of the machine is designated 22.

The tape edit marker of the present invention is generally designated 24. This apparatus 24 comprises a base frame 26 providing a recessed guideway 28 to direct the tape 16 through the apparatus 24. A feed roller 30 mounted above the guideway inlet functions to engage the top surface of the tape 16 and move it through the guideway 28. This feed roller 30 is mounted by means of a slip clutch 32 to a drive shaft 34 that is driven from a variable speed electric motor 36.

Immediately behind or downstream of the feed roller 30 is a retaining arm 38 which holds the tape 16 properly in the guideway 28. The arm 38 has a transverse slot 40, above which is mounted a lamp 42 mounted in a lamp bracket 44. For convenience, both the retaining arm 38 and the lamp bracket 44 are pivotally mounted to the base frame 26 (the latter pivot mounting being shown at 46) so that these can be moved away from the guideway to free the tape 16. Directly beneath the lamp 42 and registering with the arm opening 40 is a reader head 50 disposed transversly across the floor or bottom surface 52 of the guideway 28. This reader head 50 has seven photocells 54 which are so located as to come into registration with corresponding Teletype tape bits which will be described hereinafter.

At a predetermined location rearwardly or downstream of the lamp 42, retaining arm 38 and reader head 50, is the marking mechanism 56. This comprises an inked ribbon 58 having lengthwise red and black portion 60 and 62, respectively, on opposite sides of the centerline of the tape. The tape is mounted on two spools 64 and 66 which are rotated at intervals by a ribbon feed mechanism 68. This feed mechanism comprises a reversible electric motor 68a which is mounted to an upstanding frame 68b and turns a drive wheel 68c that frictionally engages the tape 58 on the two reels 64 and 66. The reels 64 and 66 are mounted to a respective one of two arms 68d and 68e, each of which is pivotally mounted at 68f to the frame 68b. As one of the reels 64 or 66 has the tape 58 wound thereon by action of the drive wheel 68c, the increased diameter of that reel, as more tape is wound thereon, moves the upper portion of its related arm 68d or 68e outwardly to engage one or both of two related reversing switches, the two upper switches being designated 68g and the lower two switches 68h. This reverses the motor 68a to wind the inking tape 58 in the opposite direction. The ribbon 58 is angled moderately with respect to a line drawn transversely across the guideway 28 so that the red and black areas of the tape are at the same transverse marking area of the guideway 28.

The two tape markers 70 and 72, respectively, are mounted above the guideway 28 at the marking area at which the ribbon 58 is located. Each marker 70 comprises a solenoid 74 having a marking plunger 76. In defining the operation of these markers 70 and 72, the term, "right," is used to designate that portion of the tape 16 which is on a person's right hand as he views the tape with the forward portion of the tape moving upwardly, and the term, "left," denotes the opposite side of the tape. The tape marker 70 is located above the black ribbon portion 62 above the left-hand edge of the tape 16. The marker 72 is located at the same transverse location as the marker 70, but above the red tape portion 60 at the right-hand portion of the tape 16. When the solenoid 74 of the marker 70 is actuated, its associated plunger 76 moves downardly to contact the black ribbon portion 62 to make a black mark on the left side of the tape. Correspondingly, when the right marker 72 is activated, its associated plunger 76 moves downwardly to contact the red tape portion 60 and make a red mark at the right-hand portion of the tape. As will be described hereinafter, each red mark indicates a punctuating period location on the tape 16, and each black mark indicates a paragraph division on the tape 16. A power source to operate the tape marker 70 and 72 is indicated at 78.

b. The Control Circuit

The control circuit or logic circuit, by which the markers 70 and 72 are activated at the appropriate times, is generally designated 80 and is disclosed in FIG. 10. The signals going into the circuitry 80 are derived from the aforementioned reader head 50. As indicated previously, this reader head 50 has seven photocells, spaced transversely across the tape guideway 28, with the seven photocells being located in positions corresponding to the code locations in the tape 16.

To describe the action of the reader head, reference is made to FIG. 4 which illustrates a conventional Teletype tape 16. Binary coding is used by providing a plurality of information segments arranged in rows in a predetermined pattern, with each row forming an information unit. A segment is considered to be a single informational increment which can be either a bit, as at 82, which is a punched hole, or a blank 84, which is unpunched area at a predetermined location on the tape 16. The rows of informational segments are arranged in six columns, running lengthwise along the tape 16. As seen in FIG. 4, starting from left to right, these six columns are designated sequentially by numerals 1 through 6.

At the center of the tape, there is a center row of holes 86, designated F, of smaller dimension than the bit holes 82. These are feed holes or clocking holes and are positioned one at every station or informational location along the length of the tape 16. As mentioned above, an informational unit on the tape 16 is a single transverse row of segments (either bits 82 or blanks 84) arranged in a predetermined pattern. For example, the informational unit or row designated 88 in FIG. 4 indicates a pattern where there are bits at row locations 1, 2, 3 and 6, and blanks at 4 and 5. This particular pattern is the conventional teletype coding for a punctuating period. As will be disclosed more fully hereinafter, when the tape 16 is passed through the edit tape marker apparatus 24, a red dot 89 will be marked on the right-hand side of the tape 16 directly behind the punctuating period informational unit 88.

A paragraph indication on the tape 16 is shown at 90 in FIG. 4. This comprises three rows or informational units; the first row or unit 90a having a single bit at column 2, the second 90b having a single bit at column 4, and the third informational unit 90c having bits at columns 3, 5 and 6. To correlate this to the manner which these three informational units operate in a type setting machine, the first unit 90a (code 2) is a "return" signal for the Teletype machine. The second informational unit 90b (code 4) is a signal for the Teletype machine to "elevate" which causes the machine to prepare to print a line below the previous line. The third informational unit 90c (code 3, 5, 6) signals an "em space" which is the indentation for the beginning of a paragraph. When these occur in sequence, a black dot 91 is placed after the third unit on the left of the tape 16.

The function of the aforementioned circuitry 80 is to sense The presence of the informational unit 88 and the three appropriate informational units 90 and activate, respectively, the marker 72 and the marker 70. It will be understood that as the tape 16 passes over the reader head 50, that the seven photocell units 54, designated "1, 2, 3, F, 4, 5, 6" will be activated by a bit (hole) at a corresponding column location on the tape 16. Each time the clocking hole 86 passes over the F photocell, the F photocell signals that an informational unit (a row of bits and blanks) is in position for reading. Those photocells which are activated indicate the presence of a bit 82, while those not activated indicate the presence of a blank.

To describe the operation of the circuitry shown in FIG. 10, let it be assumed that the location of a paragraph division on the tape 16 is to be ascertained. This will occur only when the three informational units at 90 in FIG. 4 pass in sequence over the reading head 50. Each of the photocells, 1, 2, 3, F, 4, 5, 6, is connected to a respective amplifier 98. The output from the middle amplifier 98-F, connected to the middle photocell F, leads to a one-shot multivibrator 100, the output of which is an abbreviated logic 0 signal, which serves as a clocking signal responding to the intervals at which each clocking hole F passes over its related photocell F.

The outputs of the other photocells 1 – 6 lead to a respective amplifier (98 – 1 . . . 98 – 6), each of which is in turn connected to a respective inverter (102 – 1 . . . 102 – 6) each of which functions to give a logic 0 signal when its related photocell 54 is activated. The output of each inverter 102 – 1 through 6 leads to a respective shift register 104 – 1 through 6. Each shift register has three data output sources, $Q_0$, $Q_1$, and $Q_2$. Each signal pulse from the multivibrator 100 functions to move a source signal in each of the shift registers 104 one step (e.g., the signal $Q_0$ to $Q_1$, or from $Q_1$ to $Q_2$, or from $Q_2$ off the register).

FIG. 4 shows the three-unit pattern at 90 which signals a paragraph division. When the first informational unit 90a (comprising a code 2 pattern) passes under the reader head 50, two things happen. First, the multivibrator clock 100 causes each shift register 104 to move one step and place a newly initiated signal on the $Q_0$ source output of each shift register. Thus, the $Q_0$ source output on the 104 – 2 shift register will have a logic 0 signal, while the other five $Q_0$ source outputs have a logic 1 signal, which indicates that their respective photocells have read a blank on the tape 16. When the next informational unit 90b passes over the reader 50, again two things occur. First, the multivibrator clock 100 pulses each of the shift registers 104 so that the signals on the $Q_0$ source outputs move one step. Thus, the shift register 104 – 2 has a logic 0 signal at its $Q_1$ source output, while the other $Q_1$ source output signals are logic 1. Also, since the photocell 4 is now activated by the presence of bit 4 in registry therewith, the $Q_0$ output source of shift register 104 – 4 now becomes logic 0, while the other five $Q_0$ output sources go to logic 1.

In like manner, when the 90C informational unit passes over the reader head 50, the $Q_0$ output sources go to logic 0 at 104 – 3, 5 and 6 while the $Q_0$ output sources as 104 – 1, 2 and 4 go to logic 1. Also the prior two inputs advance one step on their respective shift registers 104. It will be noted that at this interval the following pattern appears on the six registers 104. Only the following five source outputs are logic 0: 1) 104 – 2, $Q_2$; 2) 104 – 3, $Q_0$; 3) 104 – 4, $Q_1$; 4) 104 – 5, $Q_0$; and 5) 104 – 6, $Q_0$. All the other output sources are at this particular interval at logic 1.

It will be noted that the $Q_2$ output of the register 104 – 2, the $Q_1$ output of the register 104 – 4, and the $Q_0$ outputs from shift registers 104 – 3, 104 – 5, and 104 – 6, are each connected to a respective one of five inverters 106A through E. When the five inverters 106A through E simultaneously receive respective logic 0 signals, they transmit five simultaneous logic 1 signals to a five input nand gate 108. The usual output from the nand gate is a logic 1 signal, but when all five inputs are simultaneously logic 1 inputs, then the output of the nand gate drops to a logic 0. The output from the nand gate 108 goes to an inverter 110 which produces a logic 1 signal which in turn goes to a two input nand gate 112. Thus, it can be seen that the nand gate 108 will only transmit a signal when the $Q_2$ at shift register 104 – 2, the the $Q_1$ shift register 104 – 4, and the $Q_0$ at shift registers 104 – 3, 104 – 5 and 104 – 6 all simultaneously transmit a signal which is a logic 0 signal.

All of the other output sources, $Q_0$, $Q_1$ and $Q_2$, from the shift registers 104 which do not lead to one of the inverters 106a through e are connected to a respective input of one of two nand gates 114 and 116. Each of these nand gates 114 and 116 functions in a manner that it will transmit a logic 0 signal only when all of the inputs are logic 1 signals. The outputs from the two gates 114 and 116 function in a manner that it will transmit a logic 0 signal only when all of the inputs are logic 1 signals. The outputs from the two gates 114 and 116 go through respective inverters 118 and 120, each of which functions to modify the logic 0 signal to a logic 1 signal, which signals are in turn transmitted to inputs on yet another nand gate 122. This nand gate transmits a logic 0 signal only when its two inputs are logic 1, and this logic 0 output signal is directed to an inverter 123 which directs a logic 1 signal to the gate 112.

Thus, it can be seen that the two nand gates 114 and 116 with the inverters 118 and 120 and the third nand gate 122 function collectively as a reject gate. That is to say, the gate 122 will not transmit a logic 0 signal until every signal transmitted to the gates 114 and 116 is a logic 1 signal from its respective shift register source output, which occurs when its related photocell is not activated. In like manner the nand gate 108 functions as a passing gate, while the aforementioned nand gate 112 functions as an output gate, and will transmit a signal only when it receives a pass signal from the nand gate 108 and a reject signal from the nand gate 122.

The output signal from the nand gate 112 activates a 16-step shift register 124, since the marking mechanism 56 is located a length of 16 clocking holes downstream of the reader head 50. This shift register 124 is also connected to the multivibrator clock 100, so that at each interval that a clock hole F passes the reader head 50 the signal in the register 124 advances one step. At the end of sixteen steps, the register 124 fires a one-shot multivibrator 126 which in turn activates a relay 128 which causes the solenoid 74 of the paragraph tape marker 72 to be activated to make a black paragraph mark on the left side of the page of the tape 16 to indicate a paragraph division.

To correlate this to the operation of the apparatus 24, when the third row 90c on the Teletype passes over the reader head 50, the pass gate 108 and the reject gate 122 simultaneously transmit signals to the output gate 112, which immediately transmits an output signal to the 16-step shift register 124. As each subsequent row or unit on the Teletype tape 16 passes over the reading head 50, each clocking hole F moves the activating signal one step further on the register 16. When the 90c row on the tape has advanced 16 steps, it moves to a location below the markers 70 and 72. At this instant, the relay 128 closes to cause the marker 72 to mark the location of row 90c, thus marking a paragraph division location.

Let us now examine the situation when the Teletype information unit for a punctuating period (code 1, 2, 3, 6) passes over the reading head 50. A signal from photocells 1, 2, 3 and 6 pass directly to respective inputs of a nand gate 130. The 0 output from photocells 4 and 5 go to respective inverters 132 and 134 to produce a logic 1 signal to the remaining input of the nand gate 130. At this instant, the nand gate 130 goes to zero and activates a 16-step shift register 136, which is also stepped by the multivibrator clock 100. After 16 shift intervals, the register 136 fires a multivibrator 138 which in turn closes a relay 140 that activates the punctuating period marker 70 so as to make a red dot on the right side of the Teletype tape 16. At this time the unit indicating the period is located beneath the marker 70.

c. The Method of the Invention

With the functional details of the apparatus of the present invention now presented, the method of the present invention will now be described, with reference to FIG. 2. Let it be assumed that news information is being transmitted to the Teletype machine 10, and Teletype tape 16 and type news readout 18 are both issuing from the Teletype machine 10. The tape 16 passes into the edit marking apparatus 24 so that each punctuating period location is marked with a red dot on the right side of the tape, and the location of paragraph separations are marked with a black dot on the left side of the tape. Thus, a pattern such as that illustrated in FIG. 4A would be seen, with the period indicating red dots indicated at 142, and the paragraph indicating black dots indicated at 144.

An average news story may produce a Teletype tape of, for example, 6 to 12 feet in length, with perhaps three to five paragraph positions and two to three times that many punctuating periods. As the edit marked tape 16 of a complete news story is emitted from the apparatus 24, this length of tape is associated with the typed news readout 18 of the corresponding story. Let us assume that the typed news 18 readout is now examined by a news editor who determines that only the first three paragraphs of the story will be printed, and the remaining paragraphs deleted. The corresponding coded Teletype tape length is taken in hand and the person counts down three black dots on the left side of the tape and cuts off the remaining bottom portion of the tape at the location of the black dots. Then the upper tape section is fed into the type setting machine, which in turn produces set type corresponding to the already edited news story, which would be the first three paragraphs of tape.

If the news editor decides to terminate a story at the end of a sentence in the middle of a line not at the end of the paragraph, then a slightly different procedure is followed. The person counts the number of paragraph separations to the paragraph separation preceding the paragraph in which the deletion is to be made. Then the person counts the punctuating periods in that paragraph, and then counts down on the tape the same number of red dots on the right side of the tape 16. This will indicate to the person the location on the tape 16 corresponding to the end of the sentence at which the story is to be cut. However, for proper operation of the typesetting machine, that particular line must be completed in the Teletype machine. Thus, the person will scan further down the tape (for perhaps an inch or two) until he ascertains the location of an informational unit or row having only a bit in the column 2, which indicates the end of a line. The tape is then cut off at this point. Then the tape is fed into the type setting machine, which in turn produces in set type the selected news information. That portion of the last line of the edited news story after the final sentence is simply deleted from the set type.

Figure 2:
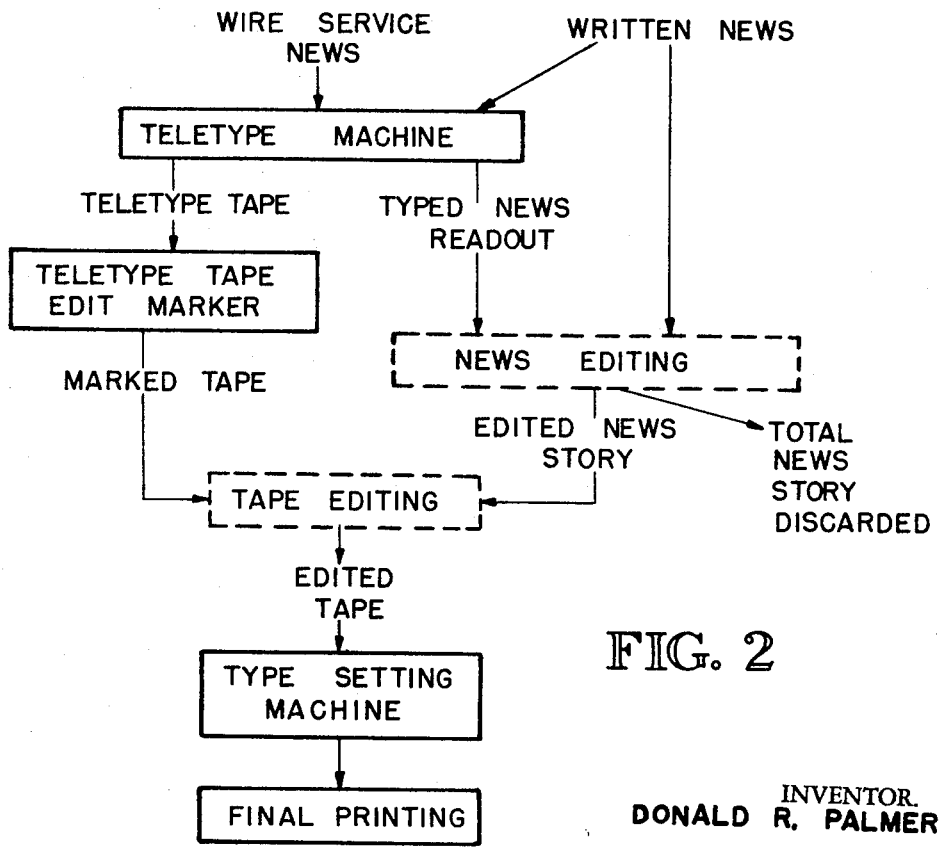
FIG. 2 is a schematic presentation of the steps comprising the method of the present invention.
Figure 6:
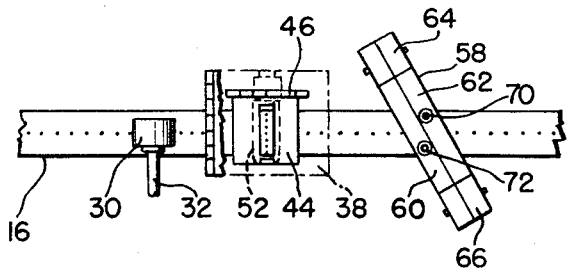
FIG. 6 is a plan view of the apparatus of FIG. 3.
Figure 7:
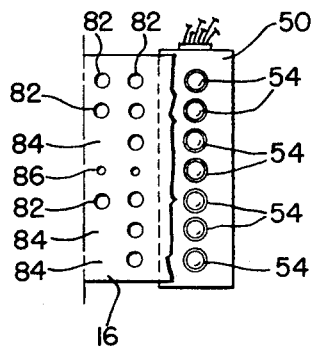
FIG. 7 is a plan view detailing the reading head of the present invention.
Figure 8:
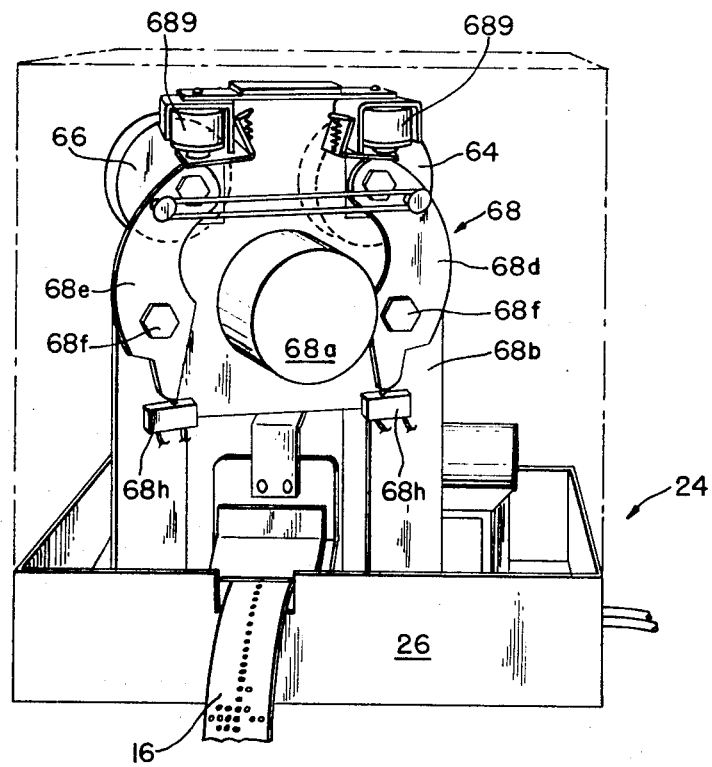
FIG. 8 is a rear perspective view of the apparatus of the present invention.
Figure 9:
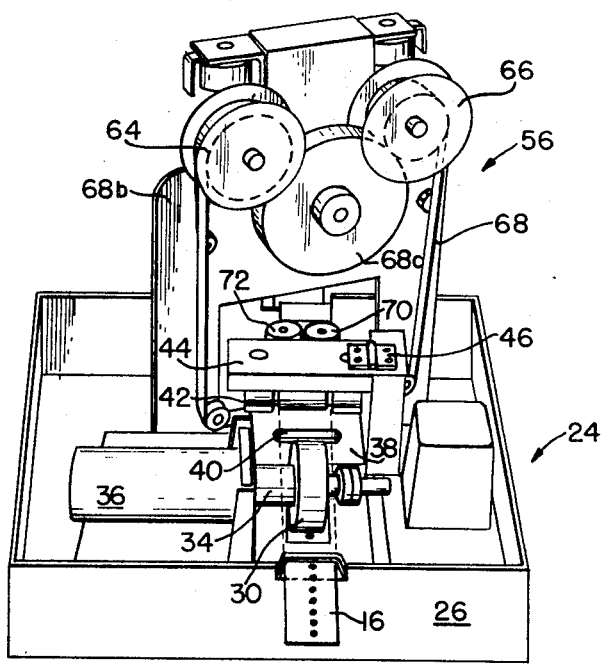
FIG. 9 is a front perspective view thereof.

Thus, it can be seen, as shown in the flow diagram of FIG. 2, that with the method of the present invention the type setting machine is setting type for edited news stories ready for final printing.

What is claimed is:

1. A method of correlating and reproducing Teletype information wherein there is provided a Teletype tape containing certain information and a separate readout containing said information in a different form, said method comprising:
   a. providing the tape with location indicators of paragraph separation locations,
   b. deleting from the tape by means of said location indicators at least one paragraph portion deleted from said readout to provide a non-deleted tape portion, and
   c. preparing type from the non-deleted tape portion.

2. The method as recited in claim 1, comprising providing said tape with location indicators of punctuating periods, and deleting from the tape by means of said punctuating period indicators a portion deleted from said readout to provide said non-deleted tape portion.

3. The method as recited in claim 1, wherein the Teletype tape has information units arranged in code patterns positioned along the length of the tape, and a paragraph separation location is made by sensing a first "return" information unit, a second "elevate" information unit, and a third "indenting" informational unit and then marking said tape in response to sensing said three informational units.

4. The method as recited in claim 3, further comprising storing the three informational units recited in claim 3 sequentially in a memory, and intiating an output signal in response to said memory containing these three informational units in sequence.

5. The method as recited in claim 3, wherein the Teletype tape has an informational unit corresponding to a punctuating period, further comprising sensing a period informational unit and activating a period indicating device to indicate on said tape the location of the period.

6. The method as recited in claim 5, characterized in that a paragraph indicator is physically marked on the tape at a first transverse location on the tape, and the period indicator is physically made on the tape at a second transverse location.

7. The method as recited in claim 5, wherein a mark of a first character is made on the tape to indicate a paragraph location, and a mark of a second character differing from the first character is made on the tape to indicate a period location.

8. The method as recited in claim 1, further comprising feeding the tape to a first reading location where the character of the informational units on the tape are sensed, and then moving the tape to a marking station where paragraph separation locations are indicated on the tape.

9. The method as recited in claim 8, wherein the character of an informational unit is sensed by directing radiant energy onto one side of the tape, and sensing the passage of radiant energy through the tape at predetermined transverse locations along the path of travel of the tape.

10. The method as recited in claim 8, further comprising, sensing in immediate sequence three informational units corresponding to a paragraph separation, counting increments of travel of said informational units toward said marking locations, and activating the paragraph location indicator at the completion of counting the increments of travel.

11. A method for reproducing selected information from an assemblage of initial information that comprises units of information arranged in a plurality of informational groups, said method comprising:
   a. providing the initial information in a coded information form adapted to effect a reproduction of coded information in a reproduced form,
   b. also representing the initial information in a substantially uncoded informational form whereby said informational groups are disposed for examination and deletion of certain informational groups,
   c. generating for the coded information form identifiable location indicators to identify the locations of respective informational groups on the coded informational form, d. deleting from the coded information form by means of said location indicators information groups deleted from said substantially uncoded informational form to provide a non-deleted coded information form, and e. effecting a reproduction from the non-deleted coded information form, whereby said reproduction corresponds to non-deleted information from the substantially uncoded informational form.

12. The method as recited in claim 11, wherein said informational units are also arranged in informational sub-groups, the method further including generating for the coded information form location indicators of said sub-groups, whereby selections can be made on said coded form of information according to said sub-groups.

13. The method as recited in claim 11, wherein said coded information form is tape having a lengthwise dimension with the informational units being disposed at intervals along the length of said tape, and the indicators are made at locations along the length of the tape.

14. The method as described in claim 13, wherein said substantially uncoded informational form is provided in visibly readable language characters, with the informational groups being paragraphs.

15. The method as recited in claim 14, wherein there are sub-groups of the substantially uncoded informational form, which are groups divided by punctuating periods, and indicators are made for the tape of period locations on the tape.

16. The method as recited in claim 13, wherein said tape is a Teletype tape having bite rows, each corresponding to a respective informational unit, and the informational units are arranged to effect operation of a type setting machine.

17. The method as recited in claim 16, including the step of sensing from said tape locations of paragraph separations and providing indicators for said tape of said paragraph separation locations.

18. The method as recited in claim 17, comprising in sequence the step of first sensing a bite row indicating a "return", sensing an adjacent second bite row indicating a "lift" and sensing a third adjacent bite row indicating an indentation spacing.

19. The method as recited in claim 18, wherein there are informational sub-groups conprising sub-groups defined by punctuating periods, the method including the further step of sensing a bite row indicating a period and marking on said tape a corresponding period location.

20. An apparatus for selection and reproduction of selected information comprising, in combination:

a. first apparatus arranged to receive information and produce this information as a Teletype tape, and also to produce this information in a substantially uncoded format not appearing on the Teletype tape, b. a tape edit marking device arranged to edit mark tape produced from the Teletype machine and provide for said tape informational divisional location indicators whereby a portion of said tape may be deleted by comparison with said substantially uncoded format according to the location indictors to provide a non-deleted tape portion, and c. a reproducing machine adapted to receive the non-deleted tape portion and reproduce the selected information contained in said tape portion in a predetermined form.

21. The apparatus as recited in claim 20, wherein the substantially uncoded format from the first apparatus is a readout of the information that it is producing on the Teletype tape, and the tape edit marking device provides informational divisional locations corresponding to informational divisions on the readout, whereby the deletion of the tape portion can be made according to comparison of information on the readout and corresponding information on the tape according to the divisional location indicators.

22. The apparatus as recited in claim 20, wherein the tape edit marking device comprises:

a. means to direct said tape along a predetermined path through said device, b. tape reading means at a first location on the device responsive to informational units on the tape, c. marking apparatus at a predetermined location downstream of said reading means, and d. delay means responsive to the reading means and arranged to produce a delayed signal to mark a tape location at a predetermined interval after the tape has passed through the reading location.

23. The apparatus as recited in claim 22, wherein the tape has a series of feed holes, and the delay means is responsive to timing intervals of feed holes passing through said device.

24. The apparatus as recited in claim 22, wherein the reading means comprises a light source directed to one side of the tape path, and a plurality of light sensing means arranged at predetermined transverse locations on the other side of said tape, whereby particular bit locations on said tape are sensed by corresponding light sensing means.

25. The apparatus as recited in claim 21, wherein there is mark actuating means responsive to a combination of a first informational unit corresponding to a "return," a second informational unit corresponding to a "lift" and a third informatinal unit corresponding to a paragraph indentation.

26. The apparatus as recited in claim 25, wherein there is a tape reader to read bite pattern informational units from said tape, memory means which receives informational units from said tape reader in sequence and stores more than one such informational unit, marking apparatus responsive to a predetermined sequence of informational units recited in claim 25 being received in said memory.

27. The apparatus as recited in claim 26, wherein said apparatus comprises a pass gate, a reject gate, and an output gate, and said memory is arranged to initiate a signal to said pass gate and a reject signal to the reject gate, which pass gate and reject gate are arranged in response to simultaneous signals from said memory to transmit simultaneous signals to said output gate to initiate the marking apparatus.

28. The apparatus as recited in claim 27, wherein said memory comprises a plurality of shift registers, each of which is connected to a respective reading element in the tape reader, and source outputs from said shift registers are connected to the pass gate and the reject gate in accordance with the pattern that the three informational units recited in claim 26 are transmitted into said shift registers.

29. The apparatus as recited in claim 28, wherein there is time delay means comprising a counter responsive to a signal from the output gate, with the counter being responsive to the tape reader being activated by feed holes of the Teletype tape.

30. The apparatus as recited in claim 25, wherein there is a period marker adapted to mark a period location on the Teletype tape, and period marking activating means responsive to said tape reader being activated by an informational unit on the Teletype tape corresponding to a punctuating period.

31. The apparatus as recited in claim 21, wherein said tape edit marking device comprises:
   a. means to direct said tape along a predetermined path through said device,
   b. a tape reader comprising individual reading elements, each of which corresponds to a respective one of a plurality of informational segments in an informational unit on said tape,
   c. marking apparatus positioned at said tape path at a location downstream of the reader,
   d. memory means comprising a plurality of memory units, each of which is responsive to respective reading elements of the reader, said memory being responsive to a first informational unit corresponding to a "return" followed immediately by a second informational unit corresponding to a "lift" followed immediately by a third informational unit corresponding to a paragraph indentation,
   e. a paragraph division mark initiating apparatus comprising a pass gate, a reject gate, and an output gate, with said memory being arranged to initiate a pass signal to said pass gate and a reject signal to the reject gate, which pass gate and reject gate are arranged in response to simultaneous signals from said memory to transmit simultaneous signals to said output gate to initiate the marking means to indicate a paragraph position in the Teletype tape, and time delay means comprising a counter responsive to a signal from the output gate, with the counter also being responsive to the tape reader being activated by feed holes of Teletype tape passing sequentially by the tape reader.

32. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
   a. means to direct said tape along a predetermined path through said device,
   b. a tape reader responsive to informational units on the tape,
   c. marking means to mark said tape at predetermined locations thereon, and
   d. actuating means responsive to predetermined information on said tape corresponding to predetermined divisional information on the tape to actuate the marking means, said actuating means being responsive to informational units on the tape indicating a paragraph separation.

33. The apparatus as recited in claim 32, wherein the mark actuating means is responsive to a combination of a first informational unit corresponding to a "return," a second informational unit corresponding to a "lift" and a third informational unit corresponding to a paragraph spacing.

34. The apparatus as recited in claim 33, wherein said actuating means comprises memory means which receive informational units from the tape reader in sequence and stores more than one such informational unit and is responsive to receiving the three informational units recited in claim 33 in immediate sequence to activate said marking means.

35. The apparatus as recited in claim 33, wherein said actuating means also comprises means responsive to an informational unit on the tape indicating a punctuating period, and said marking means has a period indicating marker responsive to said last named means.

36. A tape edit marking apparatus adapted to mark predetermined informatinal locations on a tape, such a Teletype tape, which lacks a printed readout on the tape, whereby the tape can be edited by examination and deletion of certain informational material from a separate readout containing informational material corresponding to that on the tape, said apparatus comprising,
   a. means to direct said tape along a predetermined path through said device,
   b. a tape reader responsive to informational units on the tape,
   c. marking means to mark said tape at predetermined locations thereon, and
   d. actuating means responsive to predetermined information on said tape corresponding to predetermined divisional information on the tape to actuate the marking means, said actuating means being responsive to the tape reader sensing an informatinal unit corresponding to a punctuating period, so as to activate said marking means to make a period indicator on said tape.

37. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
   a. means to direct said tape along a predetermined path through said device,
   b. a tape reader responsive to informational units on the tape,
   c. marking means to mark said tape at predetermined locations thereon,
   d. actuating means responsive to predetermined information on said tape corresponding to predetermined divisional information on the tape to actuate the marking means,
   e. said tape reader being located at a first location along said tape path, and the marking means being positioned at a second location along the tape path downstream of the tape reader, and
   f. time delay means responsive to said tape reader and operatively connected to said marking means to cause said marking means to operate after a predetermined delay period after said reader initiates a signal.

38. The apparatus as recited in claim 37 wherein said time delay means is responsive to said tape reader sensing in sequence clocking holes of said tape passing by said reader.

39. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
  a. means to direct said tape along a predetermined path through said device,
  b. a tape reader responsive to informational units on the tape,
  c. marking means to mark said tape at predetermined locations thereon,
  d. actuating means responsive to predetermined information on said tape corresponding to predetermined divisional information on the tape to actuate the marking means, and
  e. said marking means arranged to make a first mark corresponding to a paragraph location and a second mark corresponding to a punctuating period location, with the paragraph mark being at a first transverse location on the tape and the period mark being at a different transverse location on the tape.

40. The apparatus as recited in claim 39, wherein said paragraph mark has a first character, and said period mark has a second character differing from that of the paragraph mark.

41. The apparatus as recited in claim 40, wherein there is a bi-colored ink tape associated with said marking means, and the marking means engages a first colored portion of said ink tape to make a paragraph mark and a second colored portion of the ink tape to make a period mark.

42. The apparatus as recited in claim 41, wherein there is a device to move said Teletype type ink tape by said tape, said device comprising a pair of reels on which the ink tape is wound, a drive wheel engaging the ink tape on said reels, and a reversing mechanism to reverse direction of said drive wheel in response to a predetermined greater portion of ink tape being wound on one reel in relation to the other.

43. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
  a. means to direct said tape along a predetermined path through said device,
  b. a tape reader responsive to informational units on the tape,
  c. marking means to mark said tape at predetermined locations thereon,
  d. actuating means responsive to predetermined information on said tape corresponding to predetermined divisional information on the tape to actuate the marking means,
  e. said reader being arranged to read informational units on said tape in sequence, and
  f. memory means adapted to receive and store informational units from said reader in sequence, and to initiate an activating signal in response to receiving a predetermined combination of informational units in sequence.

44. The apparatus as recited in claim 43, wherein said reader comprises a plurality of reading elements, and said memory means comprises a pluralty of individual memory elements responsive to individual reader elements, each of which reader elements is in turn responsive to a related informational segment area on said tape.

45. The apparatus as recited in claim 44, wherein said actuating means comprises a pass gate, a reject gate, and an output gate and said memory means is arranged to initiate a pass signal to said pass gate and a reject signal to said reject gate, which pass gate and reject gate are arranged in response to simultaneous signals from said memory to transmit simultaneous signals to said output gate to provide an activating signal for the marking means.

46. The apparatus as recited in claim 45, wherein the marking means is located a predetermined distance downstream of the reader, and there is time delay means comprising a counter responsive to a signal from the output gate, with the counter being also responsive to the tape reader being activated by clocking holes of the tape passing by the reader.

47. The apparatus as recited in claim 43, wherein said memory means is responsive to receiving a first informational unit corresponding to a "return," receiving an immediately subsequent unit corresponding to a "lift" and receiving a third immediately subsequent informational unit corresponding to a paragraph spacing.

48. The apparatus as recited in claim 43, wherein said marking means comprises a paragraph identifying marker and a period identifying marker, said memory initiating a signal to activate said paragraph marker, and there is other activating means responsive to said reader sensing an informational unit corresponding to a period so as to activate said period marker.

49. The apparatus as recited in claim 48, wherein there is a first counter arranged to provide an output signal for the period marker and a second counter to provide an output signal for the paragraph marker, clocking signal means responsive to clocking holes passing said reader and arranged to provide clocking signals to said counters, said period counter being activated by period actuating means, and said paragraph counter being actuated by a paragraph actuating means.

50. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
  a. means to direct said tape along a predetermined path through said device,
  b. a tape reader responsive to informational units on the tape,
  c. marking means to mark said tape at predetermined locations thereon,
  d. actuating means responsive to predetermined information on said tape corresponding to predetermined divisional information on the tape to actuate the marking means, e. said tape reader comprising a plurality of individual reading elements corresponding to individual informational segments of bite patterns on the tape,
f. said marking means comprising a paragraph marker to make a paragraph identifying mark on the tape, and a period marker to make a period identifying mark on the tape, and
g. said actuating means comprising,
  1. a timing device responsive to said tape reader sensing clocking holes of said tape passing by said reader,
  2. a period marker activating means comprising period signal output means responsive to said reader sensing an informational unit on the tape corresponding to a period, and a first counter which receives a signal from the period signal means and also receives signals from the clocking means to transmit a delayed output signal to the period marker, and
  3. paragraph mark actuating means comprising paragraph signal output means responsive to informational units from said reader corresponding to a paragraph division, and a second counter responsive to said paragraph signal output means and to said clocking means to provide a delayed output signal to the paragraph marker.

51. A tape edit marking apparatus adapted to mark predetermined informational locations on a tape, such as a Teletype tape, which lacks a printed readout on the tape, whereby the tape can be edited by examination and deletion of certain informational material from a separate readout containing informational material corresponding to that on the tape, said apparatus comprising,
a. means to direct said tape along a predetermined path through said device,
b. a tape reader responsive to informational units on the tape,
c. marking means to mark said tape at predetermined locations thereon,
d. actuating means responsive to predetermined information on said tape corresponding to predetermined divisional information on the tape to actuate the marking means, and
e. said tape directing means comprising a feed roller that frictionally engages the tape to move it along said predetermined path.

52. The apparatus as recited in claim 51, wherein said feed roller is provided with a slip clutch whereby said feed roller will not rotate when a predetermined resisting force is exerted against said roller.

* * * * *